Dec. 5, 1961        H. A. NEWMAN, SR        3,011,533

COMBINATION POWER TOOL WITH ADJUSTABLE TOOL SPINDLE

Filed Jan. 14, 1959        4 Sheets-Sheet 1

INVENTOR.
Herbert A. Newman, Sr.
BY
Harness, Dickey & Pierce
ATTORNEYS.

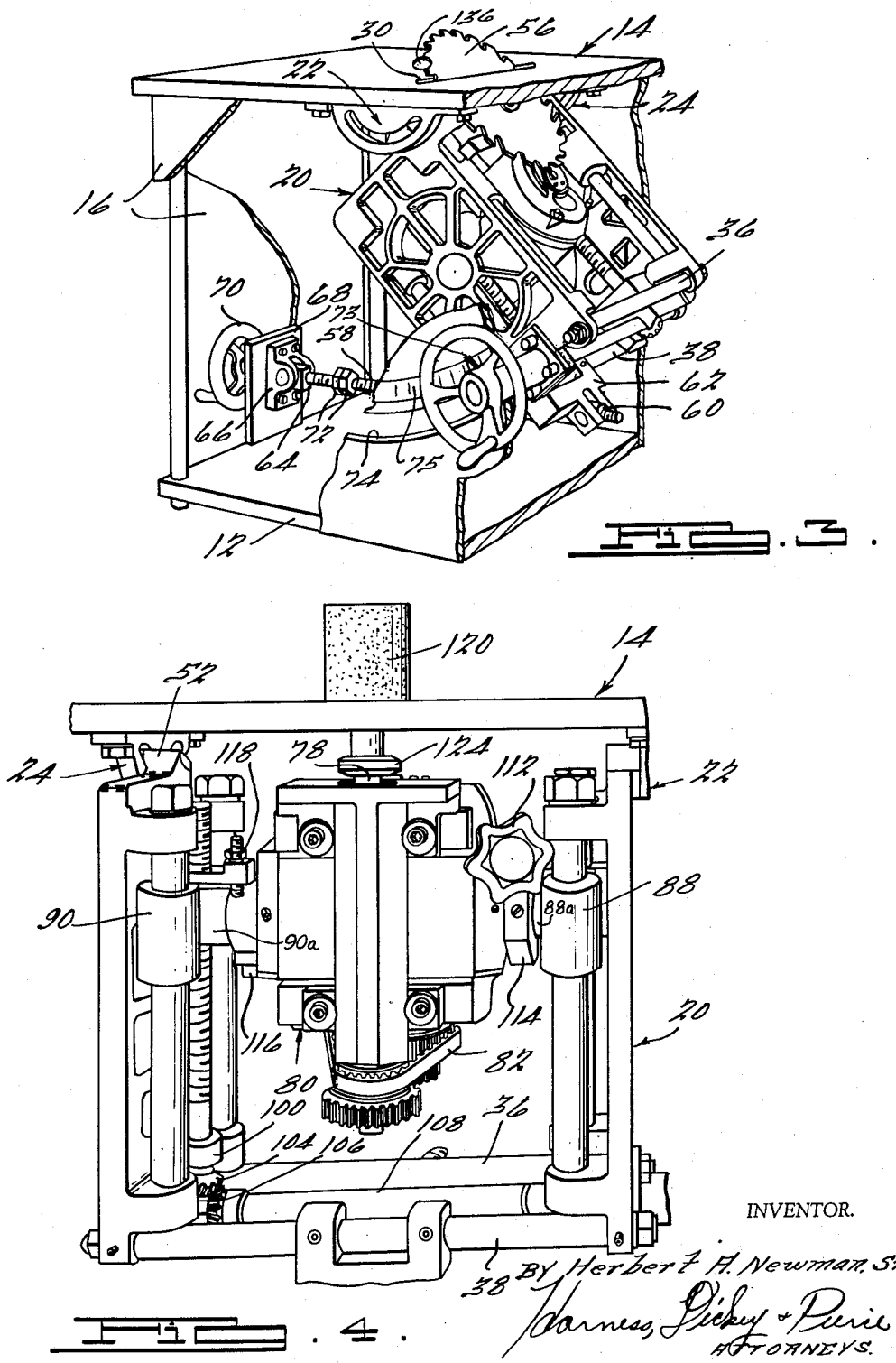

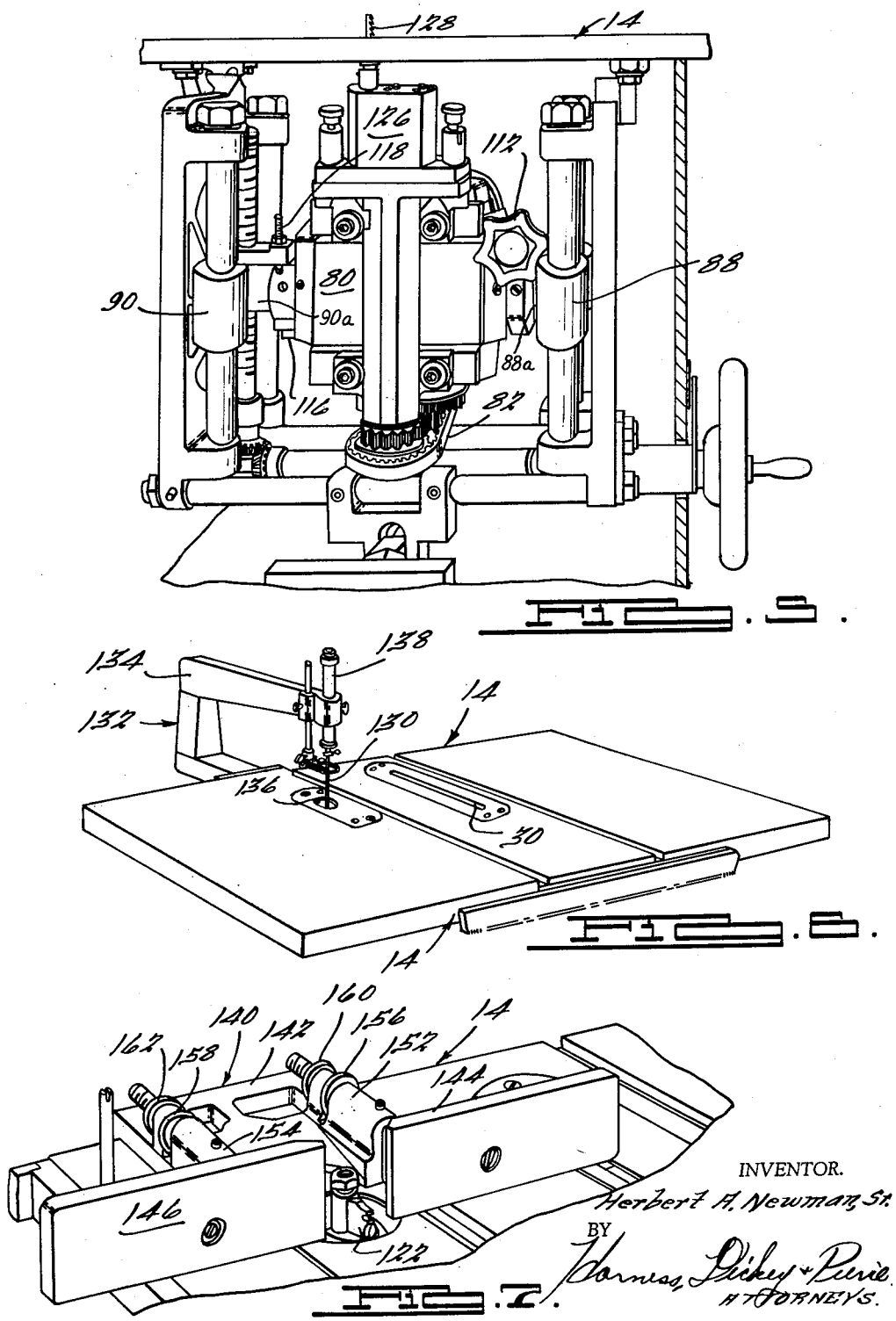

Dec. 5, 1961     H. A. NEWMAN, SR     3,011,533
COMBINATION POWER TOOL WITH ADJUSTABLE TOOL SPINDLE
Filed Jan. 14, 1959     4 Sheets-Sheet 4
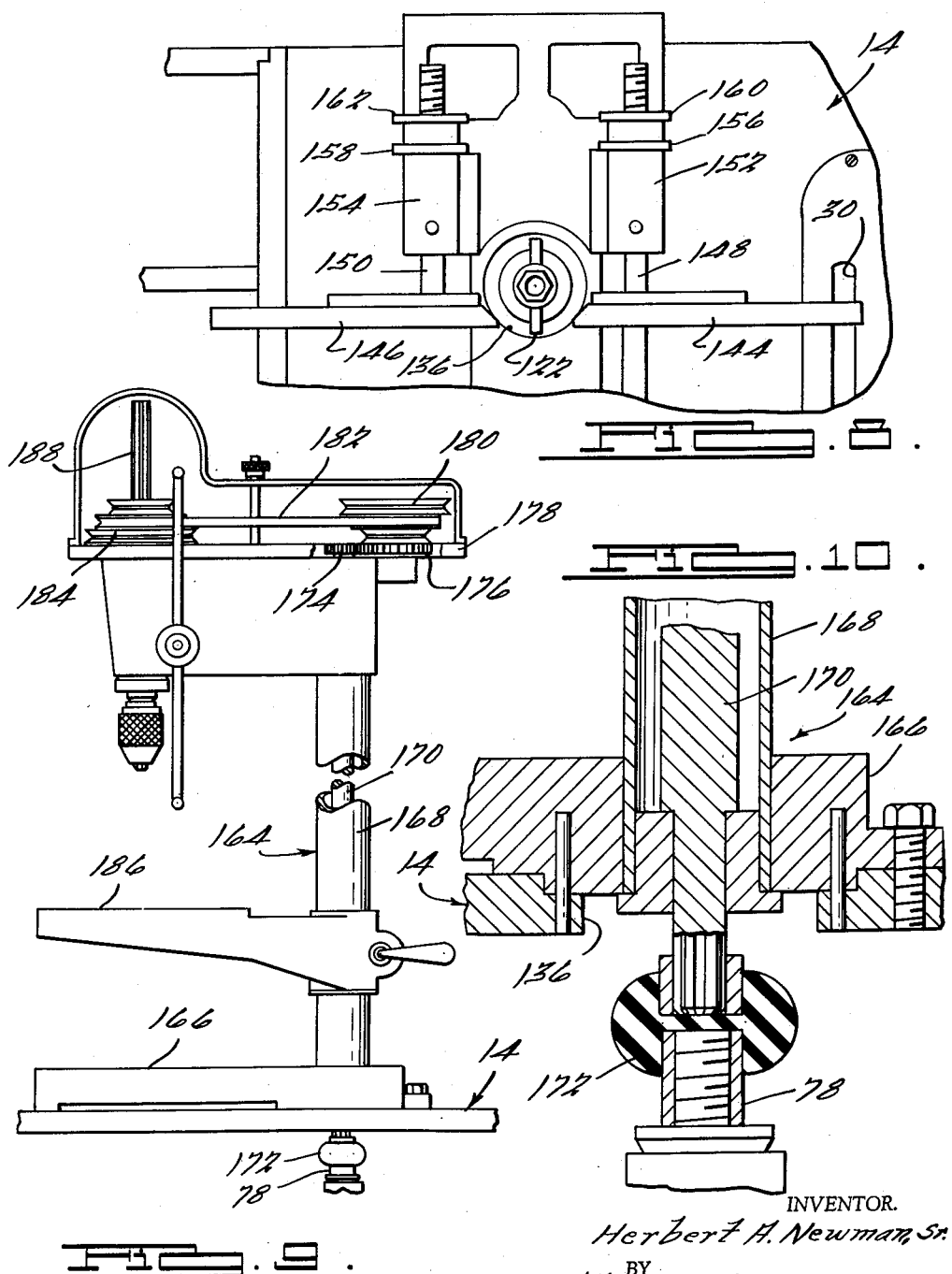
INVENTOR.
Herbert A. Newman, Sr.
BY
Harness, Dickey & Pierce.
ATTORNEYS.

United States Patent Office 3,011,533
Patented Dec. 5, 1961

3,011,533
COMBINATION POWER TOOL WITH ADJUSTABLE TOOL SPINDLE
Herbert A. Newman, Sr., Tecumseh, Mich., assignor to Double A Products Company, Manchester, Mich., a corporation of Michigan
Filed Jan. 14, 1959, Ser. No. 786,724
4 Claims. (Cl. 144—1)

This invention relates to an improved combination convertible power tool adapted to be readily and simply converted from one type of tool to another to perform a variety of wood and metal working jobs.

One important object of the present invention is to provide an improved, compact, convertible power tool.

Other objects of the invention are: to provide an improved convertible power tool including a tilting arbor table saw of rugged and sturdy construction, and capable of highly accurate heavy duty work; to provide an improved convertible power tool including a tilting arbor table saw arrangement in which the saw is fully adjustable both as to height and angle; to provide a convertible power tool including a positive drive arrangement whereby slippage between the motor and the driven member is substantially completely eliminated regardless of the position of the driven member relative to the work surface; to provide an improved convertible power tool in which the motor and the spindle are mounted in fixed positions relative to each other, thereby facilitating the provision of a positive drive between the motor and the spindle; to provide an improved power tool of this type having a motor and a spindle mounted in a common housing which is trunnioned on a frame carried beneath the work surface of the tool, and in which the frame is tiltable relative to the table for adjusting the angular position of the spindle relative to the work surface; to provide an improved convertible power tool of this type in which the motor and the spindle are mounted in a common housing which is vertically movable relative to the work surface, whereby the height of the spindle relative to the surface may be adjusted; to provide an improved convertible power tool having a motor and spindle mounted in fixed position relative to each other in an arrangement wherein the motor and the spindle may be tilted between horizontal and vertical positions for ready and simple conversion of the power tool from horizontal spindle operation to vertical spindle operation, the axis of rotation about which the motor and the spindle tilt between their vertical and horizontal positions being displaced from the working end of the spindle, whereby separate tool portals may be used in the work surface for horizontal and vertical operation; and in general, to provide an improved combination power tool of extremely compact and inexpensive, yet rugged and long wearing construction, which is convenient in operation and capable of highly accurate and reliable work in all of its various positions.

The foregoing and other objects and advantages of the present invention will become apparent in the following detailed description of a preferred embodiment thereof, taken in conjunction with the drawings, wherein:

FIGURE 1 is a perspective view, with parts broken away of a combination power tool according to a preferred embodiment of the invention;

FIG. 2 is another perspective view of the machine as shown in FIG. 1, the view being taken from the opposite side of the machine;

FIG. 3 is a perspective view with parts broken away of the machine shown in the preceding figures, the view being taken from approximately the same point as the view of FIG. 1 and showing the machine in a different operative position;

FIG. 4 is a perspective view of the tool shown in the preceding figures showing the tool arranged for vertical spindle operation with a rotary cutting tool;

FIG. 5 is a perspective view generally similar to the view of FIG. 4 showing the tool arranged for vertical spindle operation with a reciprocating cutting tool;

FIG. 6 is a perspective view of the table, or work surface of the tool shown in the preceding figures showing the tool arranged for scroll saw operation;

FIG. 7 is a fragmentary perspective view of the table, or work surface of the tool shown in the preceding figures, particularly showing an adjustable fence arranged on the table;

FIG. 8 is a fragmentary, plan view further showing details of the fence construction;

FIG. 9 is a fragmentary elevational view partly in section showing a drill press attachment for the tool shown in the preceding figures; and FIG. 10 is an enlarged cross sectional view showing the drive connection between the drill press attachment and the spindle of the machine tool.

The finest workmanship is obtainable, and work convenience and efficiency are maximized by the use of individual separate machine tools, each one of which is specifically designed for a single function. However, in many instances such as, for example, in the ordinary home workshop, the capital investment required for a large number of different machine tools is not justifiable, and is often not available to the home craftsman. Additionally, the space available for home workshop use is often relatively confined, particularly in modern houses. For these reasons, so-called combination or convertible power tools have enjoyed a growing popularity, since their cost is usually far less than the total cost of the number of individual power tools they replace, and they occupy relatively little space.

Despite the evident readiness of the market to accept well made, well designed and versatile power tools of this type, all of the units presently on the market have important shortcomings. Some of them are relatively dangerous to operate, particularly those of the type in which the driving motor and the spindle are supported above the work table surface. With this type of arrangement, the cutting tools are usually partially, and sometimes fully exposed. Other tools are unnecessarily large and bulky, difficult to convert from one function to another, are cumbersome to adjust, and lack many features that would facilitate the work of the craftsman, to improve its accuracy and speed of execution.

The combination power tool of the present invention successfully overcomes substantially all of the disadvantages of previous power tools of this type, and in addition include features and advantages not found in any previous tools of this type. By far the most used power tool in the ordinary home workshop today is the saw, and, accordingly, the machine tool of the present invention is basically a table saw, which is convertible for other uses such as horizontal or vertical sanding, sabre saw, scroll saw, drill press, and the like. It has been found that it is easier to provide a highly accurate and convenient adjustment for these conversion tools in this type of construction than it is to provide an accurate and convenient arrangement for working and adjusting a table saw that is fashioned by converting some other type of tool to table saw use.

Referring now to the drawings, a combination convertible machine tool according to a preferred embodiment of the present invention comprises a main frame assembly including corner upright supports 10, which are rigidly secured between a base platform 12 and table 14.

The frame may be completely enclosed by sheet metal panels 16 as a safety precaution and to improve the appearance of the tool. A subframe 20 is tiltably supported beneath the table 14 upon a pair of brackets 22 and 24, which are rigidly secured to and depend from the table 14. The brackets 22 and 24 have circularly curved slots 26 and 28, respectively, for supporting the subframe 20.

The subframe 20 includes a pair of relatively heavy and rigid side plates 32 and 34, which are rigidly spaced apart at their lower ends by a pair of rods 36 and 38. The side frame members 32 and 34 have arcuately shaped, outwardly projecting lugs 50 and 52, respectively, which fit into the bracket slots 26 and 28 for tiltably supporting the subframe 20 from the table 14. The curvature of the slots 26 and 28 is centered approximately upon the longitudinal axis of the saw portal 30 in the table so that the entire subframe 20 is swingable about the axis defined by the lugs 50, 52, which is substantially in the plane of the table 14 and running along the center line of the saw portal 30 for tilting the saw blade 56, and thereby adjusting its angle of cut relative to the surface of the table 14.

As perhaps best shown in FIG. 3, the angular position of the subframe 20 is adjustable by means of a drive screw 58 which is engaged by a follower nut 60 carried by the subframe 20. To permit free swinging movement of the subframe 20, the follower nut 60 is journaled in a clevis bracket 62, which is rigidly secured to the lefthand tie rod 38. At its outer end, the lead screw 58 is supported in and held against longitudinal movement by a thrust bearing assembly 64, which is tiltable in a clevis bracket 66 mounted upon a bracket 68 rigidly secured to the base 12. A handwheel 70 is rigidly secured to the end of the lead screw 58 which projects outwardly beyond the thrust bearing assembly 64 for rotating the lead screw 58 in the appropriate direction to tilt the subframe 20 to a desired angular position. A pair of lock nuts 72 may be positioned upon the lead screw 58 to provide an adjustable limit stop for the "square" position of the saw blade 56. A pointer 73 is fixed to the subframe 20 near the lower end thereof and projects through an arcuate slot 74 in one of the panels 16 for indicating the angular position of the subframe 20 upon a scale 74, which is preferably adjustably fixed to the panel 16.

The motor 76 and the spindle 78 are mounted in a common housing 80 for rotation about parallel axes, which are fixed relative to each other so that the spacing between the motor and the spindle is fixed. With this arrangement, it is possible to use either a chain drive between the motor and the spindle, or, preferably, as illustrated, a timer belt drive including a drive belt 82 provided with transverse grooves (not separately designated) for engaging the teeth (not separately designated) of the notched pulley wheels 84 and 86, which are mounted upon the spindle and the motor, respectively. In this way, the problem of slippage between the motor and the spindle, which has heretofore caused much difficulty in adjustable machines employing a belt drive, is completely avoided. In the machine tool of the present invention, the span of the power transmitting belt 82 never changes, regardless of the adjustment of the machine.

A pair of vertically slidable trunnion blocks 88 and 90 are each mounted upon two guide rods 92 and 93, and 94 and 95, respectively, which are vertically secured on the inner sides of the side plates 32 and 34 of the subframe. The trunnion blocks 88, 90 have inwardly extending oppositely disposed boss portions 88a and 90a, respectively, in which the motor-spindle housing 80 is journalled on conventional bearing means. The bosses 88a, 90a define a horizontal axis on which the motor-spindle housing 80 is freely rotatable to be quickly converted from a position in which the power tool is used, for example, as a table saw into a position in which the power tool is used, for example, in a vertical drilling operation as will be discussed subsequently.

The trunnion blocks 88 and 90 which carry the motor-spindle housing 80 are synchronously drivable up and down upon the guide rods 92–95 by a pair of vertical lead screws 96 and 98 which are threadably received in the respective trunnion blocks 88 and 90. The lower ends of the lead screws 96 and 98 extend through thrust bearing assemblies 100 and 102, respectively, which are fixed to the side plates 32 and 34, and are fitted with bevel gears 104. The bevel gears 104 at the lower ends of the drive screws 96 and 98 engage a pair of bevel gears 106 fixed upon a drive shaft 108, which is rotatably mounted at the bottom of the side plates 32 and 34 and which is drivable by means of a handwheel 110, rotation of the handwheel 110 in one direction or the other being effective to drive the entire motor-spindle housing 80 up or down upon the subframe 20, thereby to adjust the height of the cutting tool relative to the work table 14.

FIGS. 1–3 illustrate the tool arranged as a tilting arbor table saw which is fully adjustable for depth and angle of cut. For operation as a table saw, the motor-spindle housing 80 is kept in its horizontal position relative to the subframe 20, being locked in this position by the locking knob and shaft 112 which tightens a ring 114 in the right-hand trunnion block 88, as viewed in FIGS. 2 and 4. Adjustable stops 116 and 118 are provided for limiting the angular movement of the motor-spindle housing relative to the subframe 20 at the vertical and horizontal positions, so that the motor-spindle housing 80 can be readily positioned accurately either vertically or horizontally relative to the subframe. The tilting arbor motion, illustrated in FIG. 3, is achieved by pivoting the subframe 20 itself about the horizontal axis defined by the lugs 50, 52, while the motor-spindle housing 80 is maintained in its horizontal position relative to the subframe. This arrangement is used for table saw operation, for vertical disc sanding, and for all cutting tools that rotate in a vertical plane.

The table 14 may be made relatively large, such as, for example, about 24" x 27" to provide full and adequate support for large workpieces. This is achieved in the power tool according to the present invention without any sacrifice of flexibility or convenience of operation because the table 14 remains stationary and is used as the primary work support for all operations of the tool, and conversion of the tool from one operation to another does not require movement of any projecting members past the table.

For vertical spindle operation, the subframe 20 is returned to its vertical position as shown in FIGS. 1, 2 and 4, and the motor-spindle housing 80 is freely and quickly rotated 90 degrees about the horizontal axis defined by the bosses 88a and 90a and locked in its vertical position as shown in FIG. 4.

The conversion of the power tool from a table saw operation to a vertical spindle operation is best illustrated by comparing FIGS. 1 and 2 with FIGS. 4 and 5. When the power tool is positioned for table saw operation, the longitudinal axes of the motor 76 and spindle 78 are preferably perpendicular to the guide rods 92–95, as best illustrated in FIG. 2. This relationship is maintained when the angle of cut of the saw blade 56 is adjusted by pivoting the subframe 20 about the horizontal axis defined by the lugs 50, 52 as illustrated in FIG. 3. To convert the power tool to a vertical spindle operation the sub-frame is preferably positioned vertically as illustrated in FIGS. 1 and 2, with top portion of the motor-spindle housing 80 parallel to the table top 14 and the tool carrying end of the spindle 78 located below the portal 30 with the saw blade 56 extending upwardly therethrough. Then the motor-spindle housing 80 is moved downwardly by the lead screws 96 and 98 until the uppermost portion of the blade 56 is spaced below the table 14. The blade 56 is removed from the spindle 78 and the ring 114 is released so the motor-spindle housing 80 can rotate about the axis defined by the bosses 88a, 90a. The motor-spindle housing 80 is then freely and quickly rotatable into the vertical spindle operation position which is best illustrated in FIGURES 4 and 5. In this position the tool carrying end of the spindle 78 is located below a second portal 136 through which tools adapted for vertical spindle operation such as saber saws, or a drum sander and the like extend upwardly. The sub-frame 20 remains in the vertical position as illustrated in FIGURES 1 and 2 and the conversion is carried out merely by rotating the motor-spindle housing 80 on the journal supports in the bosses 88a and 90a. When the motor-spindle housing 80 has been rotated about the horizontal axis defined by the bosses 88a, 90a into position for vertical spindle operation, the top portion thereof will be vertical with respect to the table top, as best illustrated in FIGURES 4 and 5. When the device is in the vertical position as illustrated in FIGURES 4 and 5, a vertical shaft cutting tool such as the drum sander 120 shown in FIG. 4, or the shaper 122 shown in FIG. 7 is attached to the spindle 78 by an adapter 124. For reciprocatory cutting tools a gear box 126 is attached to the motor-spindle housing 80 to convert the rotary spindle motion to vertical reciprocation, as required, for example, to drive the sabre saw 128 shown in FIG. 5, or the scroll saw 130 shown in FIG. 6.

The scroll saw attachment 132 illustrated in FIG. 6 includes a C-shaped bracket member 134 which is clamped or otherwise rigidly but removably secured to the work table adjacent to the vertical spindle portal 136. The C bracket 134 includes a vertically slidable shaft 138 for attachment to the upper end of the scroll saw 130. The shaft 138 is spring biased upwardly to keep the scroll saw 130 constantly under tension, the lower end of the scroll saw being attached to the reciprocating output member of the gear box 126 for reciprocating vertical drive.

A two-piece adjustable fence 140 is also provided for use with vertical spindle tools such as the shaper 122 shown in FIGS. 7 and 8. The fence 140 includes a base 142, which is firmly clamped or bolted to the table 14 and mounts separate front and back fences 144 and 146. The fences 144 and 146 are mounted at the ends of supporting rods 148 and 150, respectively, which are slidably fitted within bushings 152 and 154 fixed upon the base 142. The rods 148 and 150 are threaded at their ends opposite from the fences 144 and 146, and are engaged by adjustment nuts 156 and 158 and jam nuts 160 and 162, by means of which they may be advanced or retracted relative to the shaper 122 and firmly locked in position. The same fence may, of course, be moved around to the other side of the table for use with the tilting arbor saw or other horizontal spindle tool, which extends through the saw portal 30.

The tool of the present invention may also be readily and simply converted for use as a drill press as shown in FIGS. 9 and 10. For this purpose, the motor-spindle housing 80 is placed in its vertical position and a drill press attachment 164 is seated on the table 14 directly over the vertical spindle portal 136. The drill press attachment includes a base 166 mounting a supporting column 168, which is hollow and through which a drive shaft 170 extends. The drive shaft 170 is connected at its lower end to the spindle 78 by means of a shock absorbing rubber coupling 172. At its upper end, the shaft 170 carries a gear 174, which meshes with a second gear 176 pivoted upon the upper plate 178 for driving a speed reducing pulley assembly 180. The pulley assembly 180 is connected to drive the spindle pulley assembly 184. A work table 186 is adjustably supported upon the column 168 for supporting a workpiece.

It will thus be seen that the convertible machine tool of the invention is highly versatile in operation, and can be readily and simply converted for many different operations, yet it is of simple and rugged construction, thereby permitting the production of highly accurate work with relatively little manual skill. Basically, the tool is an improved table saw, which includes features and advantages not heretofore available on the market to facilitate the production of high accuracy work. In addition, the conversion features of the tool are simple and easy, and require relatively little manipulation, yet involve practically no loss of ruggedness, operating convenience, or accuracy.

What is claimed is:

1. A combination power tool comprising a table having a horizontal work surface, a frame, means for pivotally mounting said frame beneath said table for limited angular movement about a first axis lying substantially in the plane of said work surface, a spindle, a motor for driving said spindle, a motor-spindle housing carrying said motor and said spindle in fixed spaced apart parallel relation to each other, means supporting said motor-spindle housing on said frame for translational movement relative thereto in a direction perpendicular to said first axis, said motor-housing supporting means further including boss means defining a second axis parallel to and spaced from said first axis, said motor-housing being rotatably journalled in said boss means for freely rotating said motor-spindle housing about said second axis and thereby quickly moving said spindle from a horizontal position to a vertical position, and means for mounting a cutting tool on said spindle for rotation substantially in a plane including said frame pivot axis, whereby said spindle is fully adjustable in position relative to said work surface for adjusting the position of a cutting tool carried by said spindle without moving the spindle relative to the motor, and tilting of said frame is effective to tilt the cutting tool relative to the work surface without causing translational movement therebetween.

2. A combination power tool comprising a table having a horizontal work surface, a frame, means for pivotally supporting said frame beneath said table for limited angular movement about a first axis parallel to said work surface, a spindle, a motor for driving said spindle, a motor-spindle housing carrying said motor and said spindle in fixed spaced apart parallel relation to each other, means supporting said motor-spindle housing on said frame for translational movement relative thereto in a direction perpendicular to said first axis, said motor-housing supporting means further including boss means defining a second axis parallel to and spaced from said first axis, said motor-spindle housing being journalled in said boss means for free rotation about said second axis whereby said motor-spindle housing can be quickly moved from a horizontal position to a vertical position, means for locking said motor-spindle housing selectively in any one of a plurality of different angular positions relative to said frame, means on said frame for driving said motor-spindle housing in translation relative to said frame, and means connected between said table and said frame for tilting said frame relative to said table, whereby the angular position of said spindle relative to said table may be adjusted by tilting said frame relative to said table and the spacing of said spindle from said table can be adjusted by translational movement of said motor-spindle housing on said frame.

3. A combination power tool comprising a table having a horizontal work surface and a plurality of tool portals in said surface, a rigid frame, means for pivotally mounting said frame beneath said table for angular movement about an axis lying approximately in the plane of said work surface and extending through one of said portals, a spindle, a motor for driving said spindle, means for mounting said motor and said spindle in fixed spaced apart relation to each other, trunnion means for supporting said motor mounting means on said frame for rotation about a horizontal axis through an angle of at least 90°, said trunnion means being vertically movable on said frame, means for driving said trunnion means along said frame for adjusting the height of said spindle relative to said table, means for mounting a cutting tool on said spindle for rotation generally in the plane of said frame pivot axis when said spindle is in a first angular position relative to said frame, means for controllably pivoting said frame relative to said table for adjusting the angular position of a cutting tool carried by said spindle without moving the cutting tool in translation relative to the table, said spindle coming into alignment with another one of said portals when it is rotated to a second angular position relative to said frame.

4. A combination power tool of the home work-shop type comprising a table having a generally horizontal work surface and a plurality of tool portals in said surface, rigid supporting means for said table, a pair of parallel brackets mounted on and depending from said table, each one of said brackets having an arcuate slot curved about an axis lying in the plane of said work surface and extending through a first one of said portals, a frame including a pair of rigid side members, a laterally projecting lug on each one of said side members adjacent to an upper corner thereof, said lugs projecting into and being slidable along said slots for supporting said frame thereon for limited swinging movement relative to said table about said axis, a pair of trunnion blocks, means for mounting said trunnion blocks for smoothly guided sliding travel along said side members in a generally vertical direction, drive means for synchronously driving said trunnion blocks along said side members, a motor-spindle housing journaled in said trunnion blocks for rotation about a horizontal axis, a spindle journaled in said housing, a motor mounted in said housing at a fixed distance from said spindle, positive drive coupling means providing a driving engagement between said motor and said spindle, means for releasably locking said motor housing alternatively in a horizontal and a vertical position relative to said frame, means for mounting a cutting tool on said spindle for rotation in a plane including said frame tilt axis when said housing is in its horizontal position so that tilting of said frame is effective to tilt the cutting tool without translating it relative to said table, said spindle coming into alignment with a second one of said portals when said housing is moved to said vertical position, and means for mounting a vertical axis cutting tool on said spindle when it is in its vertical position, the vertical axis cutting tool projecting through said second portal.

References Cited in the file of this patent

UNITED STATES PATENTS

| | | |
|---|---|---|
| 395,943 | Batman | Jan. 8, 1889 |
| 583,678 | Fifield | June 1, 1897 |
| 676,197 | Mill | June 11, 1901 |
| 1,327,390 | Josias | Jan. 6, 1920 |
| 2,038,810 | Tautz | Apr. 28, 1936 |
| 2,501,134 | Meckoski et al. | Mar. 21, 1950 |
| 2,577,206 | Patterson | Dec. 4, 1951 |
| 2,835,289 | Rockwell | May 20, 1958 |
| 2,850,054 | Eschenburg | Sept. 2, 1958 |

FOREIGN PATENTS

| | | |
|---|---|---|
| 667,388 | France | June 10, 1939 |